UNITED STATES PATENT OFFICE.

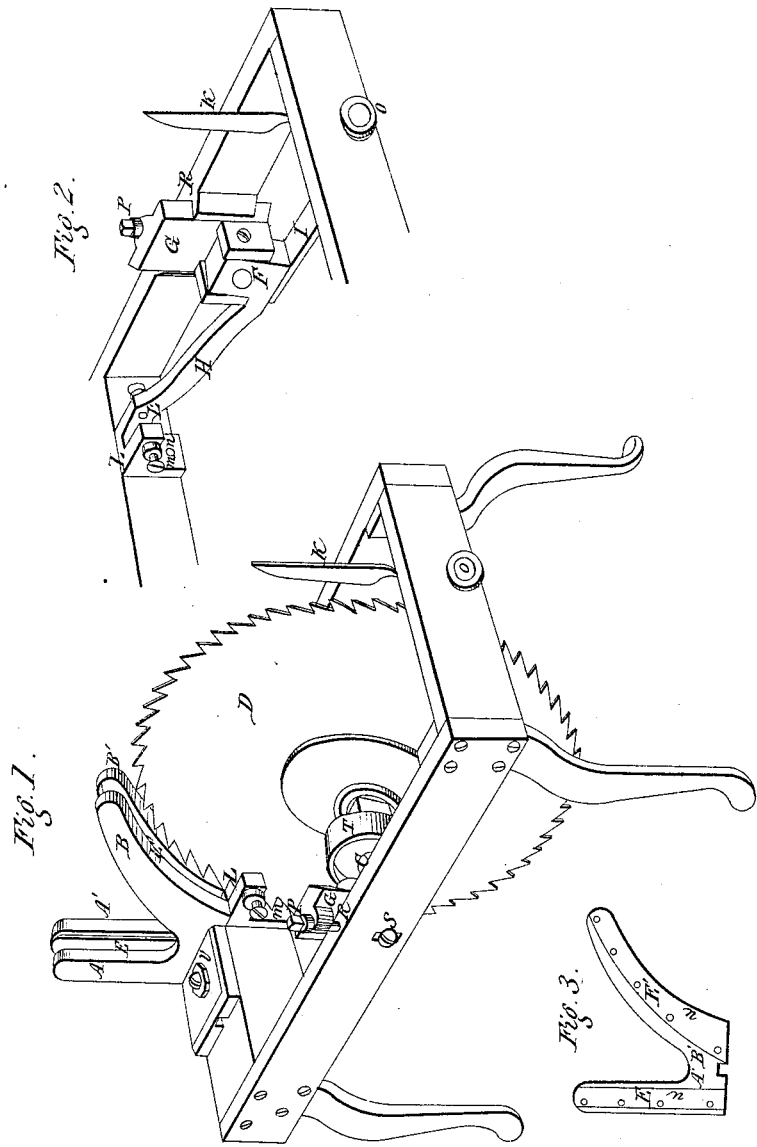

W. W. HURLBUT, OF BOONVILLE, NEW YORK.

METHOD OF HANGING CIRCULAR SAWS.

Specification of Letters Patent No. 13,989, dated December 25, 1855.

*To all whom it may concern:*

Be it known that I, WESTEL W. HURLBUT, of the town of Boonville, in the county of Oneida and State of New York, have invented certain new and useful Improvements in Machinery for Splitting or Resawing Lumber for Clapboards and other Purposes; and I do hereby declare that the following is a full and exact description of the construction and operation of the same, reference being had to the annexed drawings, making a part of this specification, like letters referring to the same parts of the machine.

The operative parts of the machine are mounted upon a frame of about three feet in length, two feet in width and two and one half high.

Figure 1, is a perspective view of the machine which may be, in connection with feed rollers, or the boards may be fed or pushed through it by hand. A, A', are perpendicular guides on the front end of the machine, each being connected respectively with the curved guides B, B', on each side of the board. E, E', are springs on the guides A', B', which serves to hold the board firmly in its passage through the machine and to admit of boards of slight unevenness in thickness, which may be occasioned by knots or otherwise, passing freely, and still being held in their proper position as they approach the saw D.

The saw D, is hung upon the shaft C, and extends across the frame into the bearings F, which are attached to, or suspended in the movable slides G, in Figs. 1 and 2.

H, in Fig. 2 is an arm, extending from, and connected with the box or bearing G, to the crossbar of the frame, passing around the edge of the saw D, and forming the guides for the edges of the saw, L, L'. M, is a flange on the extreme end of the arm H, under the guides L, L', and is suspended on the screw N. I, is an arm connecting with the bearing F, and arm H, and extends in the opposite direction to the back end of the machine, and is there attached to the knife or opening wedge K. The arm S has a flange similar to the one on H, through which it is secured in its proper position by means of the screw O, in Figs. 1 and 2.

The movable slides G, G, in Figs. 1, 2, may be raised or lowered to regulate the position of the guides L, L', the saw D, and the opening wedge K, they being connected as described, in a manner to move to the desired position with the turning of the screws, or bolts P, P, which pass into the side bars of the frame.

The object of connecting the saw guides L, L', and the wedge K, in the manner described with the saw D, by means of the arms H, and I, is that they may assume their proper positions, when the saw D, is set as regulated, for splitting or resawing the board, either square, or diagonally, thus permitting the guides for this board A, A', and B, B', to remain, in all cases in an upright position.

The movable slides G, G, are secured when arranged for use, by means of screws through the side bars of the frame, as seen at S, in Fig. 1.

T, in Fig. 1, is a pulley on the saw shaft C, and receives the belt, for conveying motion to the saw D.

Fig. 3, represents the manner of constructing the springs on the straight and curved guides A', and B', the springs being secured to the respective guides, nearest their forward edges, which set back from the surface of the board, while the opposite edge of each, or surface U, U, presses firmly against the board to effect the object before described.

The flanges V, seen in Fig. 1, is attached to the guides A, B, by which they are secured in their proper places.

What I claim as new and as my invention or improvement in the above described machine, and for which only I desire to procure a patent is as follows:

The arms H, and I, as connected with the guides L, L', the bearing F, and the opening wedge K, in such manner, as to adjust with the movement of the saw D.

WESTEL W. HURLBUT.

Witnesses:
  D. GILLMORE,
  WM. DENT.